United States Patent [19]

Angliker et al.

[11] 4,039,529
[45] Aug. 2, 1977

[54] CYCLOALIPHATIC DICARBONYL CONTAINING AZO DYESTUFFS

[75] Inventors: Hans-Joerg Angliker; Richard Peter; Walter Jenny, all of Basel, Switzerland

[73] Assignee: Ciba-Geigy AG, Basel, Switzerland

[21] Appl. No.: 617,224

[22] Filed: Sept. 26, 1975

Related U.S. Application Data

[63] Continuation of Ser. No. 341,669, March 15, 1973, abandoned, which is a continuation of Ser. No. 84,467, Oct. 27, 1970, abandoned.

[30] Foreign Application Priority Data

Nov. 3, 1969 Switzerland .................. 16350/69

[51] Int. Cl.² ............... C09B 29/08; C09B 29/26; C09B 43/00
[52] U.S. Cl. ........................... 260/207.1; 260/152; 260/153; 260/154; 260/155; 260/156; 260/157; 260/158; 260/162; 260/163; 260/187; 260/205; 260/206; 260/207; 260/455 R; 260/465 D; 260/468 R; 260/468 G; 260/468 L; 260/471 A; 260/473 R; 260/482 C; 260/490; 260/553 R; 260/556 A; 260/557 R
[58] Field of Search .......................... 260/207, 207.1

[56] References Cited

U.S. PATENT DOCUMENTS 2,354,187  7/1944  Felix et al. ............... 260/207.1 X

FOREIGN PATENT DOCUMENTS 1,218,091  6/1966  Germany ............... 260/207.1

*Primary Examiner*—Charles F. Warren
*Attorney, Agent, or Firm*—Karl F. Jorda; Edward McC. Roberts; Michael W. Glynn

[57] ABSTRACT

An azo compound free from sulfonic acid groups of the formula

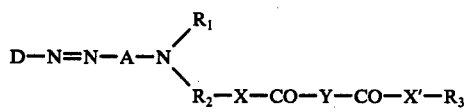

wherein D is the radical of a diazo component, A is a p-phenylene radical which may be substituted, X is an —NH— group, a sulfur atom or an oxygen atom, Y is a cycloaliphatic radical containing up to 12 carbon atoms, X' is an —NH— group, a sulfur atom or an oxygen atom, $R_1$ is an alkyl radical which may be substituted, $R_2$ is an alkylene radical which may be substituted and $R_3$ is an organic radical, and mixtures of said azo compounds with one another, with or without other azo dyestuffs.

7 Claims, No Drawings

CYCLOALIPHATIC DICARBONYL CONTAINING AZO DYESTUFFS

This is a continuation of application Ser. No. 341,669 filed Mar. 15, 1973 (now abandoned) which application was a continuation of application Ser. No. 84,467, filed Oct. 27, 1970 and now abandoned.

This invention provides new valuable azo compounds free from sulphonic acid groups of the formula

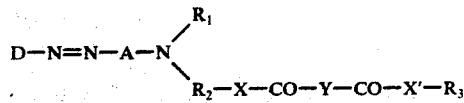

wherein D is the radical of a diazo component, A is an optionally substituted 1,4-phenylene radical, $R_2$ is an optionally substituted alkylene radical, X is an -NH- group, a sulphur atom or preferably an oxygen atom, Y is a cycloaliphatic radical, X' is an -NH-group, a sulphur atom or preferably an oxygen atom, $R_1$ is an optionally substituted alkyl radical and $R_3$ is an organic radical, preferably an alkyl radical.

According to the invention, the compounds may be obtained when (a) a diazonium compound of a diazo component is coupled with a coupling component of the formula

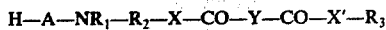

wherein A, $R_1$, $R_2$, $R_3$, X, X' and Y have the same meaning as indicated above, or (b) an azo compound of the formula

wherein $R_1'$ is an optionally substituted alkyl group or a radical of the formula $-R_2-X-H$, and D has the same meaning as given above, is condensed with a monohalide of the formula

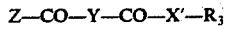

wherein Z is a halogen atom, preferably a chlorine atom, and (c) the resulting products are treated with a quaternising agent if desired.

Compounds of interest are those of the following formulae free from acid groups:

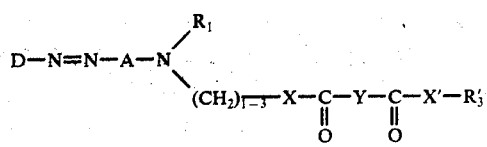

and

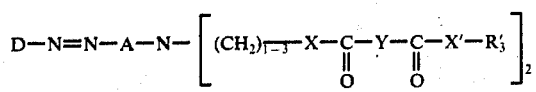

wherein D, A, X, X', $R_1$ and Y are the meanings given above and $R_3'$ is an alkyl group.

Compounds of the formulae

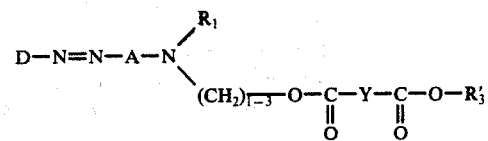

and

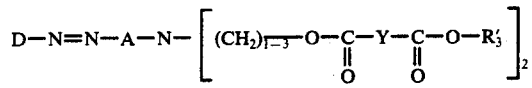

wherein D, A, $R_1$, $R_3'$ and Y have the same meanings as above, are particularly preferred.

The group A advantageously has the formula

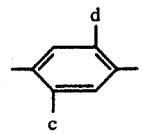

wherein $c$ is in the ortho-position to the azo group and $d$ is in the ortho-position to the amino group.

The radicals $c$ and $d$ each represents a hydrogen or chlorine atom, a lower alkyl or alkoxy radical, for example methyl, ethyl, methoxy or ethoxy, and also a phenylthio or phenoxy radical.

The radical $c$ can also represent a bromine atom, a trifluoromethyl group and an acylamino group which may be alkylated, preferably methylated, at the nitrogen atom, and in which the acyl radical is the radical of a carboxylic acid, for example a formyl, acetyl, propionyl, butyryl or benzoyl radical, the radical of an organic monosulphonic acid, for example a methane sulphonic, ethane sulphonic or p-toluene monosulphonic acid radical, or the radical of a carbonic acid monoester or carbonic acid monoamide, for example, a methoxycarbonyl, phenoxycarbonyl, aminocarbonyl or butylaminocarbonyl radical.

The group $R_1$ can represent a hydrogen atom, an alkyl group or a substituted alkyl group. As examples of a substituted alkyl group there may be mentioned: β-chloroethyl, β,β,β-trifluorethyl, β,γ-dichloropropyl, benzyl, β-phenylethyl, β-cyanoethyl, alkoxyalkyl, for example β-ethoxyethyl or δ-methoxybutyl, hydroxyalkyl, for example β-hydroxyethyl or β-γ-dihydroxypropyl, carbalkoxy, for example β-carbo-(methoxy-, ethoxy- or propoxy)-ethyl (wherein the terminal alkyl group can carry a cyano, carbalkoxy, acyloxy or alkoxy group in the ω'-position), β- or γ-carbo(methoxy or ethoxy)-propyl, acylaminoalkyl, for example β-(acetyl- or formyl)-aminoethyl, acyloxyalkyl, for example β-acetoxyethyl or β,γ-diacetoxypropyl, β-alkylsulphonylalkyl, for example β-methanesulphonylethyl or β-ethanesulphonylethyl, alkylcarboamoyloxyalkyl or arylcarbamoyloxyalkyl, for example β-methylcarbamyloxyethyl, alkyloxy-carbonyloxyalkyl, for example β-(methoxy-, ethoxy- or isopropoxy)-carbonylethyl, γ-acetamidopropyl, β-(β'-acetylethoxycarbonyl)-ethyl, β-[β'-(cyano-, hydroxy-, methoxy- or acetoxy)-ethoxycarbonyl]-ethyl, cyanoalkoxyalkyl, β-carboxyethyl, β-acetyl-ethyl, β-diethylaminoethyl, β-cyanoacetoxyethyl, β-benzoyloxyethyl or β-(p-alkoxy- or phenoxybenzoyloxy)-ethyl. The group $R_1$ in general contains up to eight carbon atoms. The term lower alkyl group represents optionally substituted alkyl radicals having up to 8 carbon atoms.

As examples of alkylene radicals $R_2$, the following may be mentioned (in which the terminal amino group of the azo dyestuff is also included so as to characterise the position):

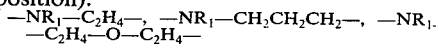

and

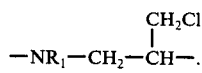

The diazo radical D is mainly derived from monocyclic or bicyclic amines of the formula $$D-NH_2$$

for example any desired diazotisable amine that does not contain an acid substituent which imparts solubility in water, but especially for amines which possess a heterocyclic 5-membered ring having 2 or 3 hetero-atoms, particularly a nitrogen atom and one or two sulphur, oxygen or nitrogen atoms as hetero-atoms, and aminobenzenes, particularly negatively substituted aminobenzenes, especially those of the formula

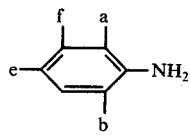

wherein a denotes a hydrogen or halogen atom, or an alkyl or alkoxy, nitro, cyano, carbalkoxy or alkylsulphone group, b denotes a hydrogen or halogen atom or an alkyl, cyano or trifluoromethyl group, e denotes a nitro, cyano, carbalkoxy or alkylsulphonyl group and f denotes a hydrogen or halogen atom or a carbalkoxy or carboxylic acid amide group.

As examples there may be mentioned: 2-aminothiazole, 2-amino-5-nitrothiazole, 2-amino-5-methylsulphonyl-thiazole, 2-amino-5-cyanothiazole, 2-amino-4-methyl-5-nitrothiazole, 3-amino-5-nitro-benzisothiazole, 3-amino-5-nitro-7-bromobenzisothiazole, 3-amino-benzlsothiazole, 3-amino-5-chlorobenzisothiazole, 3-amino-7-chloro-benzisothiazole, 3-amino-4-chlorobenzisothiazole, 3-amino-5,7-dichloro-benzisothiazole, 3-amino-5-chloro-7-bromo-benzisothiazole, 3-amino-6-methyl-benzisothiazole, 3-amino-5,7-dibromo-benzisothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 5-(methyl-, ethyl-, phenyl- or benzyl)-1,2,4-triazole, 3-amino-1-(4'-methoxyphenyl)-pyrazole, 2-aminobenzthiazole, 2-amino-6-methoxy-benzthiazole, 2-amino-6-chlorobenzthiazole, 2-amino-6-cyanobenzthiazole, 2-amino-6-thiocyanobenzthiazole, 2-amino-6-nitrobenzthiazole, 2-amino-6-carboethoxybenzthiazole, 2-amino-(4- or 6)-methylsulphonylbenzthiazole, 2-amino-1,3,4-thiadiazole, 2-amino-1,3,5-thiadiazole, 2-amino-4-phenyl- or 4-methyl-1,3,5-thiadiazole, 2-amino-5-phenyl-1,3,4-thiadiazole, 2-amino-3-nitro-5-methylsulphonyl-thiophene, 2-amino-3,5-bis-(methylsulphonyl)-thiophene, 5-amino-3-methyl-isothiazole, 2-amino-4-cyanopyrazole, 2-(4'-nitrophenyl)-3-amino-4-cyanopyrazole, 3- or 4-aminophthalimide, aminobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carbethoxybenzene, 1-amino-2-chloro-4-methylsulphonylbenzene, 1-amino-2-methylsulphonyl-4-chlorobenzene, 1-amino-2,4-dinitro-6-methylsulphonylbenzene, 1-amino-2,4-dinitro-6-(2'-hydroxy-ethylsulphonyl)-benzene, 1-amino-2,4-dinitro-6-(2'-chloroethylsulphonyl)-benzene, 1-amino-2-methylsulphonyl-4-nitrobenzeno, 1-amino-2-methylsulphonyl-4-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 2-cyano-4-chloroaniline, 2-cyano-4-chloro-6-bromoaniline, 2-cyano-4,6-dibromoaniline, 1-amino-2,6-dichloro-4-nitrobenzene, 1-amino-2,4-dicyano-6-chlorobenzene, 4-aminobenzoic acid cyclohexyl ester, 1-amino-2,4-dinitro-6-chlorobenzene and especially 1-amino-2-cyano-4-nitrobenzene, also 1-aminobenzene-2-, -3- or -4-sulphonic acid amides, for example N-methylamide or N,N-diethylamide, N,γ-isopropoxypropyl-2-aminonaphthalene-6-sulphonic acid amide, N,γ-isopropoxypropyl-1-aminobenzene-2-, -3- or -4-sulphonic acid amide, N-isopropyl-1-aminobenzene-2-, -3- or -4-sulphonic acid amide, N,γ-methoxypropyl-1-aminobenzene-2-, -3- or -4-sulphonic acid amide, N,N-bis-(β-hydroxyethyl)-1-aminobenzene-2-, -3- or -4-sulphonic acid amide, 1-amino-4-chlorobenzene-2-sulphonic acid amide and the N-substituted derivatives thereof, 2-, 3- or 4-aminophenylsulphamate, 2-amino-4-, -5- or -6-methylphenylsulphamate, 2-amino-5-methoxy-phenylsulphamate, 3-amino-6-chlorophenylsulphamate, 3-amino-2,6-dichlorophenylsulphamate, 4-amino-2- or -3-methoxyphenylsulphamate, N,N-dimethyl-2-aminophenylsulphamate, N,N-di-n-butyl-2-aminophenylsulphamate, N,N-dimethyl-2-amino-4-chlorophenylsulphamate, N,n-propyl-3-aminophenylsulphamate, N,N-di-n-butyl-3-aminophenylsulphamate, O(3-aminophenyl)N-morpholine-N-sulphonate, O(3-aminophenyl)-N-piperidine-sulphonate, N-cyclohexyl-O(3-aminophenyl)-sulphonate, N(N-methylaniline)-O-(3-aminophenyl)-sulphonate,N,N-diethyl-3-amino-6-methylphenyl-sulphamate, N-ethyleneimine-O-(4-aminophenyl)-sulphonate, N,N-dimethyl-4-aminophenylsulphamate, O-(n-propyl)-O-(3-aminophenyl)-sulphonate, O,β-chloroethyl-O-(2-aminophenyl)-sulphonate, O-benzyl-O-(3-aminophenyl)-sulphonate and O-ethyl-O-(4-amino-2,6-dimethylphenyl)-sulphonate, 4-aminoazobenzene, 3,2'-dimethyl-4-aminoazobenzene, 2-methyl-5-methoxy-4-aminoazobenzene, 4-amino-2-nitroazobenzene, 2,5-dimethoxy-4-aminoazobenzene, 4'-methoxy-4-aminoazobenzene, 2-methyl-4'-methoxy-4-aminoazobenzene, 3,6,4'-trimethoxy-4-aminoazobenzene, 4'-aminoazobenzene, 2'- or 3'-chloro-4-aminoazobenzene, 3-nitro-4-amino-2', 2'-dichloroazobenzene and 4-aminoazobenzene-4'-sulphonic acid amide.

Instead of the above-mentioned diazo components that are free from ionic groups which impart solubility in water, those that contain fibre-reactive groups may also be used, for example s-triazinyl radicals, which carry 1 or 2 halogen atoms, for example fluorine, chlorine or bromine atoms on the triazine ring, pyrimidyl radicals which carry one or two chlorine atoms or fluorine atoms or one or two arylsulphonyl or alkanesulphonyl groups on the pyrimidine ring, mono- or bis-(γ-halogen-β-hydroxypropyl)-amino groups, β-haloenoethylsulphamyl radicals, β-halogenethoxy groups, β-halogenoethylmercapto groups, 2-chlorobenzthiazolyl-6-azo groups, 2-chlorobenzthiazolyl-6-amino groups, γ-halogeno-β-hydroxy-propylsulphamyl radicals, chloroacetylamino groups, α,β-dibromopropionyl groups, vinylsulphonyl groups and 2,3-epoxypropyl groups.

Suitable fibre-reactive diazo components are, for example, N,β-chloroethyl-3-chloro-4-aminobenzenesulphamide (hydrochloride), N,β-chloroethyl-4-aminobenzenesulphamide (hydrochloride), 3-bromo-4-amino-ω-chloroacetophenone, N,γ-chloro-β-hydroxypropyl-4-aminobenzenesulphamide, N,β-chloroethyl-1-amino-4-naphthylsulphonamide, N,β-chloroethyl-1-amino-3,5-dichloro-benzenesulphamide and 4-(γ-chloro-β-hydroxypropoxy)-aniline.

The diazotisation of the diazo components mentioned can be carried out according to the position of the particular amino group, for example with a mineral acid and sodium nitrite or, for example, with a solution of nitrosylsulphuric acid in concentrated sulphuric acid.

The coupling can also be effected in known manner, for example in a neutral to acid medium, if desired in the presence of sodium acetate or similar buffer substances that influence the rate of coupling, or of catalysts, for example dimethylformamide, pyridine or its salts.

The coupling components can be obtained by acylating an amine of the formula

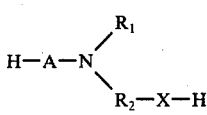

wherein A, $R_1$, $R_2$ and X have the meanings given above, with a monoester or monoamide of a cycloaliphatic carboxylic acid of the formula HOOC—Y—CO—X'—$R_3$ or reactive derivatives thereof, for example a halide or anhydride.

Suitable cycloaliphatic carboxylic acid monoesters, monothioesters and monoamides are for example derived from the following cycloaliphatic dicarboxylic acids: tetrahydrophthalic acid, methyl-tetrahydrophathalic acid, isomerised 4-methyl-tetrahydrophthalic acid, endomethylenetetahydrophthalic acid, hexahydrophthalic acid, methylhexahydrophthalic acid, endomethylene-hexahydrophthalic acid, hexahydroterephthalic acid and hydrogenated benzenetricarboxylic and benzenetetracarboxylic acids.

Suitable amines of the formula

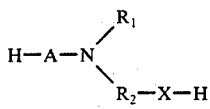

are for example: N,n-butyl-N-β'-hydroxyethylaniline, N-methyl-N-β'-hydroxyethylaniline, N-β-cyanoethyl-N-β'-hydroxyethylaniline, N,β-cyanoethyl-N,β'-hydroxyethyl-3-chloroaniline, N-ethyl-N,β'-hydroxyethyl-2-methoxyaniline, N-ethyl-N,β'-hydroxyethyl-2-methylaniline, Nβ-cyanoethyl-N,β'-hydroxyethyl-2-acetylaminoaniline, N,β-(β'-cyanoethyoxyethyl)-N,β''-hydroxyethylaniline, N,β-cyanoethyl-N,β'-hydroxyethyl-3-methylaniline and N,γ-methylaminopropyl-N-ethylaniline.

Suitable monoesters, monoamides and monothioesters are for example the monomethyl and monobutyl esters, the N-butylmonoamides and N-ethylmonoamides, and the ethyl thioesters of the above-mentioned cycloaliphatic dicarboxylic acids.

In order to increase the absorption capacity, the dyestuffs can be manufactured from mixtures of several components. This may be carried out for example by coupling mixtures of coupling components with a single diazo component. Such mixtures of coupling components may for example be obtained by using, as monoester halide (a) mixtures of different alkyl monoester chlorides which are derived from different alkyl groups, and reacting the mixture with a bis-(β-hydroxyethyl)-aniline.

A single monoester chloride may also be used as starting material and reacted (b) together with an equal molar amount of a fatty acid chloride with a bis-(β-hydroxyethyl)-aniline. The variants (a) and (b) may also be combined. Mixtures of the dyestuffs of the formulae:

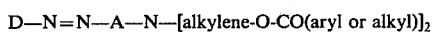

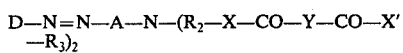

and

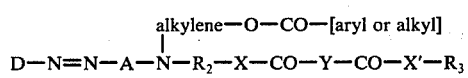

are obtained, the latter component forming the main part of the mixture.

Those of the above-mentioned heterocyclic diazo components which contain a quaternatable nitrogen atom can also be combined oxidatively in the N-alkylated form as hydrazones or as azosulphones (compare Angewandte Chemie, Volume 70, 215 (1958); Volume 74, 818 (1962); Volume 80, 343 (1968).

Those of the new compounds that contain a quaternated amino group can also be obtained by quaternating the corresponding dyestuffs which contain a non-quaternated amino group by treatment with alkylating agents.

Such alkylating agents or quaternating agents are for example: esters of strong mineral acids or organic sulphonic acids, for example dimethyl sulphate or diethyl sulphate, alkyl halides for example methyl chloride, bromide or iodide, aralkyl halides, for example benzyl chloride, esters of low molecular alkane-sulphonic acids, for example methyl esters of methane sulphonic acid, ethane sulphonic acid or butane sulphonic acid, and esters of benzene sulphonic acids which may carry additional substituents, for example methyl, ethyl, propyl or butyl esters of benzene sulphonic acid; α,β-unsaturated compounds in the presence of strong acids, for example acrylamide in the presence of hydrogen chloride or galcial acetic acid may also be used as alkylating agents.

The alkylation is advantageously carried out by heating in an inert organic solvent, for example hydrocarbons, for example benzene, toluene or xylene, halogenated hydrocarbons, for example carbon tetrachloride, tetrachloroethane, chlorobenzene, o-dichlorobenzene or nitrohydrocarbons, for example nitromethane, nitrobenzene or a nitronaphthalene. acid anhydrides, acid amides or nitriles, for example acetic anhydride, dimethylformamide or acetonitrile, and also dimethylsulphoxoide, can be used as solvents during the alkylation. Instead of a solvent, a large excess of alkylating agent may also be used. In this case it is necessary, however, to take care that the mixture does not become overheated, since the reaction is strongly exothermic. Nevertheless it is necessary in most cases, especially in the presence of organic solvent, to heat the reaction mixture externally in order to start the reaction. In special cases the alkylation can be also be carried out in an aqueous medium or using an alcohol, if desired in the presence of a small amount of potassium iodide.

Where purification of the dyestuff salts is necessary, it is advantageously effected by dissolving these in water, with any unreacted starting dyestuff being filtered off as an insoluble residue. The dyestuff can again be separated from the aqueous solution by adding water-soluble salts, for example sodium chloride.

The non-quaternated dyestuffs are as a rule insoluble in water.

The new compounds, their mixtures with one another and their mixtures with other azo dyestuffs are excellently suitable for dyeing and printing leather, wool, silk and particularly synthetic fibres, for example acrylic or acrylonitrile fibres, polyacrylonitrile fibres and copolymers of acrylonitrile and other vinyl compounds, for example acrylic esters, acrylamides, vinylpyridine, vinyl chloride or vinylidene chloride, copolymers of dicyanoethylene and vinyl acetate, as well as fibres of acrylonitrile block copolymers, fibres of polyurethanes, polyolefins, for example basically-modified, nickel-modified or unmodified polypropylene, cellulose triacetate and cellulose 2½-acetate, and especially fibres of polyamides, for example nylon 6, nylon 6,6 or nylon 12 and aromatic polyesters, for example those from terephthalic acid and ethylene glycol or 1,4-dimethylcyclohexane, and copolymers from terephthalic acid and isophthalic acid and ethylene glycol.

For dyeing in aqueous liquors, the water-insoluble dyestuffs are advantageously used in a finely divided form and dyeing is carried out with the addition of dispersing agents, for example sulphite cellulose waste lye or synthetic detergents, or a combination of different wetting agents and dispersing agents. As a rule it is advisable to convert the dyestuffs to be used, before dyeing, into a dyeing preparation that contains a dispersing agent and finely divided dyestuff in such a form that on dilution of the dyestuff preparations with water a fine dispersion is produced. Such dyestuff preparations can be obtained in known manner, for example by grinding the dyestuff in a dry or wet state with or without addition of dispersing agents during the grinding process.

To obtain intense dyeings on polyethylene terephthalate fibres it is desirable to add a swelling agent to the dye bath or to carry out the dyeing process under pressure at temperatures above 100°, for example at 120° C. Suitable swelling agents are aromatic carboxylic acids, for example salicylic acids, phenols, for example o- or p-hydroxydiphenyl, aromatic halogen compounds, for example o-dichlorobenzene or diphenyl.

For thermofixing the dyestuff, the padded polyester fabric is heated to temperatures of above 100° C, for example between 180° and 210° C, advantageously after prior drying, for example in a stream of warm air.

The dyeings obtained according to the above processes can be subjected to an after-treatment, for example by heating with an aqueous solution of a non-ionic detergent.

Instead of being applied by impregnation, the compounds indicated can also be applied by printing according to the present process. For this purpose, a printing colour is for example used that contains the finely dispersed dyestuff in addition to the auxiliary agents generally used in printing, for example wetting agents and thickeners.

Furthermore, dyeing can for example be carried out in organic solvent liquors, for example a mixture of perchloroethylene and dimethylformamide or methanol.

Using the present process, strong dyeings and prints are obtained that have good fastness properties, especially good fastness to thermofixing, sublimation, pleating, exhaust gas, cross-dyeing, dry-cleaning and chlorine, and good wet fastness properties, for example fastness to water, washing and perspiration. The very high melting points of the new compounds, which permit easier conditioning as dyestuffs, should also be emphasised.

The new water-insoluble compounds can also be used for the spin dyeing of polyamides, polyesters, and polyolefines. The polymers to be coloured, advantageously in the form of powder, granules or chips, a ready made-up spinning solution or in the fused state, is mixed with the dyestuff, which is introduced in the dry state or in the form of a dispersion or solution into a solvent, which may be volatile. After homogeneous distribution of the dyestuff in the solution or melt of the polymer, the mixture is processed in known manner by casting, pressing or extrusion to give fibres, yarns, monofilaments, films and the like.

In the examples that follow, the parts denote parts by weight and the percentages denote percentages by weight unless otherwise stated.

EXAMPLE 1

50 parts of endomethylenetetrahydrophthalic acid anhydride are stirred for 4 hours under reflux with 50 parts by volume of methanol. Thereafter the excess methanol is evaporated in vacuo. The resulting half-ester of the endomethylenetetrahydrophthalic acid is stirred with 60 parts by volume of thionyl chloride for 3 hours at 35° to 40° C, and the excess thionyl chloride is evaporated in vacuo.

7.6 parts of N-β-cyanoethyl-N-β-hydroxyethylaniline are dissolved in 40 parts by volume of dry pyridine and 16 parts of the above endomethylenetetrahydrophthalic acid monomethyl ester chloride are added dropwise at 15° to 20° C. The mixture is stirred for 1 hour at room temperature, poured onto ice water and taken up in chloroform. The chloroform phase is repeatedly washed with water, dried with sodium sulphate and evaporated in vacuo, whereupon the coupling component of the formula

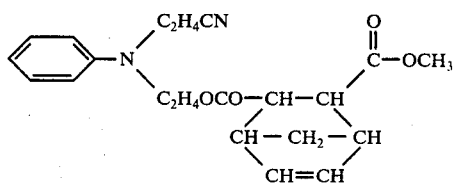

remains as a brownish oil.

1.73 parts of 2-chloro-4-nitroaniline are diazotised in 1-N-nitrosylsulphuric acid, poured onto ice and mixed with a little sulphamic acid. 3.7 parts of the above coupling component (dissolved in 60 parts by volume of glacial acetic acid) are added dropwise at 0° to 5° C. The mixture is stirred overnight at 0° to 5° C, the resulting precipitate is filtered and washed with water until the washing remains neutral. The compound of the formula

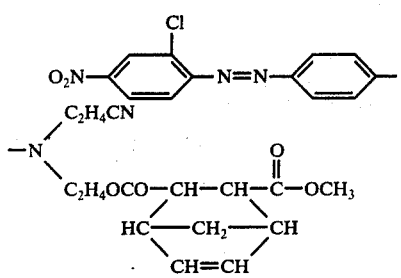

which dyes polyester material orange-red shades having excellent fastness to light and maximum fastness to sublimation is obtained.

EXAMPLE 2

100 parts of hexahydrophthalic acid anhydride are first treated with 100 parts by volume of methanol and then with 120 parts by volume of thionyl cloride analogously to the instruction given in Example 1. 6.5 parts of N,N-bis-β-hydroxyethyl-m-chloroaniline are acylated in dry pyridine with 21 parts of the hexahydrophthalic acid monomethyl ester chloride thus obtained to form the coupling component of the formula

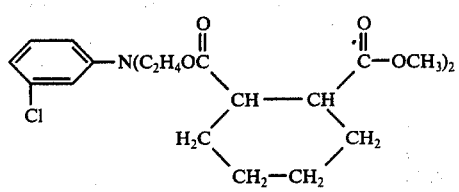

1.63 parts of 2-cyano-4-nitroaniline are diazotised in 10 parts by volume of 1-N nitrosylsulphuric acid at 20 to 25° C and thereafter poured at 0 to 10° C onto 100 parts by volume of glacial acetic acid/propionic acid 6:1. A solution of 5.5 parts of the above coupling component in 30 parts by volume of a mixture of glacial acetic acid and propionic acid is slowly added dropwise at 0° to 5° C and finally a little water is added. The mixture is stirred overnight at 0° to 5° C, the precipitate is filtered by suction and washed with water until the washing reacts neutrally. The dyestuff of the formula

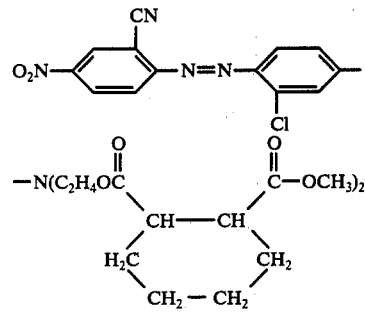

is obtained which dyes polyester material bluish-tinged red shades having excellent fastness to light and maximum fastness to sublimation.

The dyestuff of the general formula

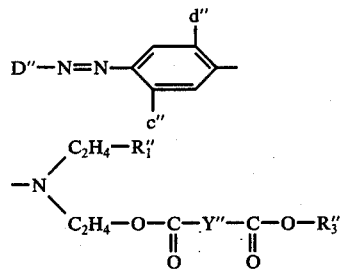

indicated in the following table, which dye polyester fabrics the shade indicated in the last column unless otherwise stated, may be obtained in a similar manner.

When the term syn is indicated for the meaning of $R''_1$, the compounds are symmetrically N-substituted compounds of the formula

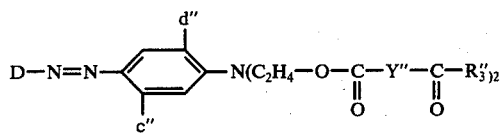

wherein $R''_1$ represents the radical

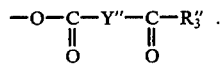

The name of the acid

The name of the acid HOOC—Y'''-COOH is indicated for the radical Y'''. The letters PA stand for synthetic polyamide fibres.

| | D'' | c'' | d'' | $R_1''$ | Y'' | $R_3''$ | Shade |
|---|---|---|---|---|---|---|---|
| 1 | 2-cyano-4-nitroaniline | CH$_3$ | H | sym. | tetrahydrophthalic acid | CH$_3$ | ruby |
| 2 | " | " | " | " | hexahydrophthalic acid | " | " |
| 3 | " | " | " | " | " | C$_2$H$_5$ | " |
| 4 | " | " | " | " | " | C$_3$H$_7$ | " |
| 5 | " | H | " | CN | tetrahydrophthalic acid | CH$_3$ | red |
| 6 | " | " | " | " | hexahydrophthalic acid | " | " |
| 7 | 2-chloro-4-nitroaniline | " | " | " | " | " | orange |
| 8 | 4-nitroaniline | " | " | " | tetrahydrophthalic acid | " | " |
| 9 | 2-cyano-4-nitroaniline | CH$_3$ | " | sym. | hexahydrophthalic | C$_2$H$_4$Cl | violet |

-continued

| | D″ | c″ | d″ | R₁″ | Y″ | R₃″ | Shade |
|---|---|---|---|---|---|---|---|
| 10 | ″ | H | ″ | ″ | acid ″ | ″ | red |
| 11 | 2-chloro-4-nitroaniline | Cl | ″ | ″ | ″ | CH₃ | scarlet |
| 12 | 2-cyano-4-nitroaniline | H | ″ | CN | endomethylenetetra-hydrophthalic acid | ″ | red tinged |
| 13 | 4-nitroaniline | CH₃ | H | COOC₂H₅ | hexahydrophthalic acid | CH₃ | yellowish-tinged red |
| 14 | ″ | H | H | OCONHC₂H₅ | tetrahydrophthalic acid | C₂H₅ | orange-red |
| 15 | 2-chloro-4-nitroaniline | Cl | H | OC₂H₄CN | tetrahydrophthalic acid | C₄H₉ | red |
| 16 | 2-cyano-4-nitroaniline | H | H | OCH₃ | ″ | CH₃ | ″ |
| 17 | 2-chloro-4-nitroaniline | Cl | H | OCOCH₃ | endomethylenetetra-hydrophthalic acid | CH₃ | scarlet |
| 18 | ″ | CH₃ | H | OCOC₂H₅ | hexahydrophthalic acid | C₃H₇ | red |
| 19 | 2-cyano-4-nitroaniline | CH₃ | H | OCOC₃H₇ | ″ | CH₃ | yellowish-tinged red |
| 20 | ″ | CH₃ | H | OCOOC₂H₅ | ″ | CH₃ | bluish-tinged red |
| 21 | 2-chloro-4-methyl-sulphonylaniline | H | H | OCOC₄H₉ | ″ | C₂H₅ | yellow-orange |
| 22 | 2-cyano-4-chloraniline | H | H | OCOCH(CH₃)₂ (OCOCH with two CH₃) | ″ | CH₃ | ″ |
| 23 | 4-aminosulphonylaniline | CH₃ | H | OCOC₆H₅ | tetrahydrophthalic acid | CH₃ | yellow |
| 24 | 2-phenoxy-4-nitroaniline | CH₃ | H | C₆H₅ | tetrahydrophthalic acid | C₂H₅ | bluish-tinged red |
| 25 | 2,5-dimethoxy-4-cyanoaniline | H | H | OCOC₆H₄OCH₃ | ″ | CH₃ | scarlet |
| 26 | 2-cyano-4-chloroaniline | H | H | OCOC₆H₄Cl | hexahydrophthalic acid | CH₃ | orange |
| 27 | 2-chloro-4-methyl-sulphonylaniline | H | H | OH | endomethylenetetra-hydrophthalic acid | C₂H₅ | orange |
| 28 | 3-phenyl-5-amino-1,2,4-thiadiazole | NHCOCH₃ | H | sym. | hexahydrophthalic acid | CH₃ | red |
| 29 | 2-amino-6-nitrobenzthiazole | NHCOC₂H₅ | H | sym. | ″ | CH₃ | violet |
| 30 | 2-amino-5-nitrothiazole | NHCOC₃H₇ | H | H | ″ | CH₃ | blue |
| 31 | 2-amino-6-ethoxybenzthiazole | NHCOC₂H₅ | H | CN | ″ | CH₃ | blue-red |
| 32 | 2-trifluoromethyl-4-chloraniline | OCH₃ | H | H | tetrahydrophthalic acid | CH₃ | yellow-orange |
| 33 | 2-amino-6-acetyl-aminobenzthiazole | CH₃ | H | H | ″ | CH₃ | bluish-tinged red |
| 34 | 2-carbomethoxy-4-nitroaniline | CH₃ | H | CN | ″ | C₂H₅ | orange |
| 35 | 2-chloro-4-nitroaniline | H | H | OCO-furyl | ″ | CH₃ | yellowish-orange red |
| 36 | 2-cyano-4-chloroaniline | H | H | OCO-thienyl | ″ | CH₃ | orange |
| 37 | 2-chloro-4-methyl-sulphonylaniline | H | H | OCO-(tetrahydrofuryl dimethyl) | hexahydrophthalic acid | C₃H₇ | ″ |
| 38 | 2-cyano-4-nitroaniline | NHSO₂CH₃ | H | sym. | tetrahydrophthalic acid | CH₃ | blue-red |
| 39 | 2-chloro-4-methyl-sulphonylaniline | NHCHO | H | ″ | ″ | CH₃ | orange |
| 40 | 2-chloro-4-nitroaniline | NHCONH₂ | H | sym. | hexahydrophthalic acid | CH₃ | yellowish-tinged red |
| 41 | 2-cyano-4-chloroaniline | NHCONH-C₄H₉ | H | H | ″ | CH₃ | orange |
| 42 | 4-nitroaniline | NCH₃COCH₃ | H | H | ″ | CH₃ | ″ |
| 43 | 2,6-dichloro-4-nitroaniline | OC₆H₅ | OCH₃ | sym. | ″ | CH₃ | brown |
| 44 | 2-cyano-4-nitroaniline | OC₆H₅ | CH₃ | CN | tetrahydrophthalic acid | CH₃ | blue-red |
| 45 | 2-nitro-4-methylaniline | SC₆H₅ | OCH₃ | H | ″ | C₂H₅ | orange |
| 46 | 2-cyano-4-nitroaniline | C₆H₅ | OCH₃ | H | ″ | CH₃ | claret |
| 47 | 2-cyano-4-nitro-6-bromoaniline | OC₆H₅ | Cl | H | ″ | CH₃ | violet |
| 48 | 2-amino-6-cyanobenzthiazole | OC₆H₅ | OCH₃ | sym. | ″ | CH₃ | bluish-tinged red |
| 49 | 2-phenoxy-4-nitroaniline | H | OCH₃ | sym. | endomethylenetetra-hydrophthalic acid | CH₃ | red |
| 50 | 2-chloro-4-nitroaniline | H | Cl | CN | tetrahydrophthalic acid | CH₃ | yellowish-tinged red |
| 51 | 2-cyano-4-chloroaniline | CH₂C₆H₅ | H | CN | tetrahydrophthalic acid | CH₃ | bluish-tinged red |
| 52 | 2-cyano-4-nitroaniline | OC₆H₁₁ | H | H | ″ | CH₃ | ″ |
| 53 | 2-cyano-4-nitro-6- | NHCOCH₃ | OCH₃ | OCH₃ | ″ | CH₃ | blue |

-continued

| | D″ | c″ | d″ | R₁″ | Y″ | R₃″ | Shade |
|---|---|---|---|---|---|---|---|
| | bromoaniline | | | | | | |
| 54 | 2-cyano-4-nitroaniline | OCH₃ | Cl | H | ″ | CH₃ | blue-red |
| 55 | 2-chloro-4-nitroaniline | SC₆H₅ | H | CN | ″ | CH₃ | orange-red |
| 56 | 4-aminosulphonylaniline | CH₃ | H | OCO-[pyridyl] | ″ | C₂H₅ | yellow |
| 57 | 2,5-dimethoxy-4-cyanoaniline | H | H | OCO-[pyridyl] | ″ | CH₃ | scarlet |
| 58 | 2-cyano-4-nitro-6-chloroaniline | CH₃ | H | OCO-[pyridyl] | endomethylenetetrahydrophthalic acid | CH₃ | violet |
| 59 | 2-chloro-4-nitroaniline | Cl | H | OCO—NH—CH(—CH₂—SO₂—CH₂—CH) | tetrahydrophthalic acid | CH₃ | orange-red |
| 60 | 2-chloro-4-nitroaniline | Br | H | OCOCH₃ | ″ | CH₃ | scarlet |
| 61 | 2-cyano-4-nitroaniline | CF₃ | H | H | ″ | CH₃ | red |
| 62 | 2-cyano-4-chloroaniline | NH—CO—CHBr—CH₂Br | H | H | hexahydro acid | CH₃ | yellow red o |
| 63 | 2-cyano-4-chloro-6-bromoaniline | [triazine with F, NH-C, N=C, F] | H | CN | tetrahydrophthalic acid | C₂H₅ | red on PA |
| 64 | 2-cyano-4,6-dibromoaniline | NH-CO-CH₂Cl | H | OCH₃ | endomethylenetetrahydrophthalic acid | CH₃ | red on PA |
| 65 | 2-chloro-4-sulphomethylaniline | [triazine with OCH₃, Cl] | H | H | tetrahydrophthalic acid | CH₃ | yellowish-tinged red on PA |
| 66 | 4-aminosulphonylaniline | CH₃ | H | OCOCH₂Cl | ″ | C₃H₇ | yellow on PA |
| 67 | 2,5-dimethoxy-4-cyanoaniline | H | H | ″ | ″ | CH₃ | scarlet on PA |
| 68 | 3-phenyl-5-amino-1,2,4-thiadiazole | [triazine with OC₂H₄OC₂H₅, Cl] | H | sym. | hexahydrophthalic acid | CH₃ | red on PA |
| 69 | 2-amino-6-ethoxy-benzthiazole | [triazine with Cl, N(C₂H₄OH)₂] | H | CN | hexahydrophthalic acid | CH₃ | blue-red on PA |
| 70 | 3-amino-5-nitro-benzisothiazole | CH₃ | H | CN | tetrahydrophthalic acid | CH₃ | blue |
| 71 | 3-amino-5-nitro-7-bromobenzisothiazole | CH₃ | H | H | hexahydrophthalic acid | CH₃ | greenish-tinged blue |
| 72 | 3-amino-benzisothiazole | NHCOCH₃ | H | H | endomethylenetetrahydrophthalic acid | C₂H₅ | blue |
| 73 | 3-amino-5-chloro- | H | H | sym. | hexahydrophthalic acid | CH₃ | reddish-tinged blue |
| 74 | 3-amino-7-chloro-benzisothiazole | Cl | CH₃ | H | ″ | CH₃ | blue |
| 75 | 3-amino-4-chloro-benzisothiazole | OCH₃ | OCH₃ | H | tetrahydrophthalic acid | C₃H₇ | blue |
| 76 | 3-amino-5,7-dichloro-benzisothiazole | OC₆H₅ | H | COOCH₃ | hexahydrophthalic acid | C₂H₅ | blue |
| 77 | 3-amino-5-chloro-7-bromobenzisothiazole | H | H | CN | ″ | CH₃ | reddish-tinged blue |
| 78 | 3-amino-6-methyl-benzisothiazole | CF₃ | H | H | endomethylenetetrahydrophthalic acid | CH₃ | reddish-tinged blue |
| 79 | 3-amino-5,7-dibromo- | CH₃ | H | CN | tetrahydrophthalic | CH₃ | blue |

EXAMPLE 3

18 parts of 3-methyl-benzthiazolone-2-hydrazone are stirred with 300 parts by volume of water and 10 parts by volume of concentrated hydrochloric acid. A solution of 34.7 parts of the product of formula

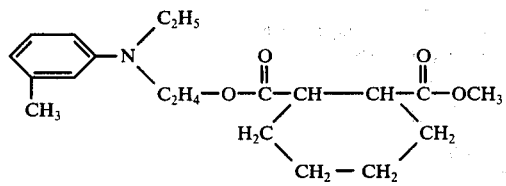

in 200 parts of volume of methanol and 20 parts by volume of concentrated hydrochloric acid is then added. 200 parts by volume of a 35% iron-III chloride solution are added at room temperature and the solution is neutralised by adding sodium acetate solution. After completion of the coupling the dyestuff is filtered, if necessary after salting out and dried in vacuo. A product of formula

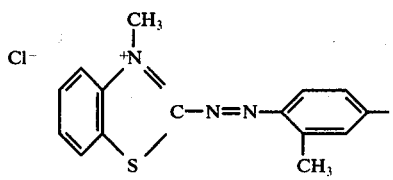

is obtained, which dyes polyacrylonitrile blue shades.

2 parts of the dyestuff obtained above are dissolved in 3000 parts of water with the addition of one part of crystalline sodium acetate, 5 parts of calcined Glauber's salt and sufficient acetic acid to obtain a pH value of 4.5 to 5. 100 parts of polyacrylonitrile filament yarn are introduced into this dye bath at 80° C, the temperature is raised to a maximum of 120° C within 45 minutes, and dyeing is carried out for 30 minutes at 120° C. Thereafter the bath is slowly cooled and the yarn rinsed. A strong blue dyeing is obtained.

The same dyestuff is obtained when 15 parts of 2-aminobenzthiazole are diazotised in nitrosylsulphuric acid and the diazonium compound is coupled with 34.7 parts of the above coupling component. The resulting dispersion dyestuff is alkylated in dimethylformamide with excess dimethyl sulphate at 80° C and precipitated with ethyl acetate. The dyestuff is purified by dissolving in hot water and repreciptated with sodium chloride solution.

The quaternated dyestuffs of the general formula

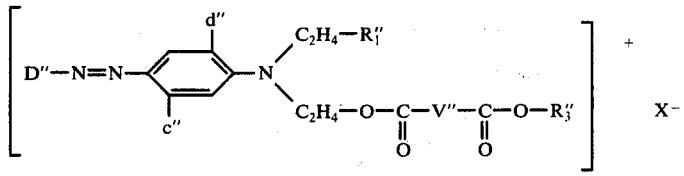

indicated in the following Table 2, which dye acrylic fibres the shade indicated in the last column, may be obtained in an analogous manner to that of the preceding section. Since the dyestuffs are precipitated with sodium chloride, the anion $X^-$ is always a chloride ion.

When the term syn is indicated for the meaning of $R''_1$, the compounds are symmetrically N-substituted compounds of the formula

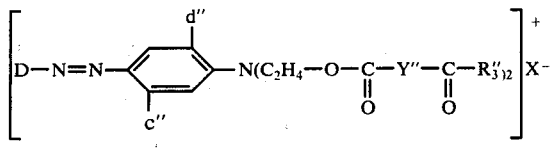

wherein $R''_1$ represents the radical

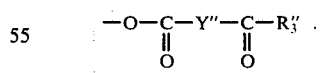

The name of the acid $HOOC-Y''-COOH$ is indicated for the radical $Y''$.

Table 2

| | D'' | c'' | d'' | $R_1''$ | Y'' | $R_3''$ | Shade |
|---|---|---|---|---|---|---|---|
| 1 | 2-aminobenzthiazole | CH₃ | H | CN | tetrahydrophthalic acid | CH₃ | blue |
| 2 | 2-amino-5-nitro-7-bromobenzisothiazole | H | H | H | " | CH₃ | greenish-ting blue |
| 3 | 2-amino-6-cyanobenzthiazole | Cl | H | OCH₃ | " | C₂H₅ | blue |

Table 2-continued

| | D″ | c″ | d″ | $R_1″$ | Y″ | $R_3″$ | Shade |
|---|---|---|---|---|---|---|---|
| 4 | 2-amino-6-dimethylaminosulphonyl-benzthiazole | $OCH_3$ | H | hexahydrophthalic acid | $C_3H_7$ | | blue |
| 4 | 2-amino-6-dimethylaminosulphonyl-benzthiazole | $OCH_3$ | $OCH_3$ | H | hexahydrophthalic acid | $C_3H_7$ | blue |
| 5 | 2-amino-6-methylbenzthiazole | $CH_3$ | H | $CH_3$ | " | $CH_3$ | blue |
| 6 | 3-amino-5,7-dibromobenzisothizole | $CH_3$ | H | $OCH_3$ | " | $CH_3$ | greenish-tinged blue |
| 7 | 3-amino-6-methylnbenzisothiazole | Cl | $OCH_5$ | H | " | $C_3H_7$ | blue |
| 8 | 3-methyl-6-ethoxybenzthiazolone-2-hydrazone | H | H | $COOCH_3$ | endomethylenetetra-hydrophthalic acid | $CH_3$ | blue |
| 9 | 1-methyl-2-aminotriazole | H | H | sym. | hexyhydrophthalic acid | $C_2H_5$ | red |
| 10 | p-amino-ω-(N-chlorotrimethylamino)-acetophenone (without alkylation) | H | H | H | " | $CH_3$ | yellow |

EXAMPLE 4

101.5 parts of hexahydrophthalic acid anhydride in a mixture of 18 parts by volume of methanol, 26 parts by volume of ethanol and 34 parts of volume of isopropanol are heated for 5 hours under reflux whilst stirring. After evaporating the excess alcohols, 133 parts of a mixture of ester-carboxylic acids remain. 80 parts of this mixture in 80 parts by volume of thionyl chloride and 0.5 part by volume of dimethylformamide are stirred for 2½ hours at 35° to 40° C. After evaporating the excess thionyl chloride the residue is distilled. 73 parts of a mixture of the ester-acid chlorides are obtained. 3.3 parts of this mixture and 1.2 parts of acetyl chloride are added dropwise at 15 to 20° C to a solution of 1.81 parts of N-bis-(2-hydroxyethyl)-aniline in 20 parts by volume of pyridine, the mixture is stirred for one hour at room temperature and poured onto 200 parts by volume of ice-water, the mixture is extracted with benzene, and the benzene phase is washed with water and evaporated. 4 parts of a mixture of coupling components are left as a residue. 1.63 parts of 2-cyano-4-nitroaniline are diazotised in nitrosylsulphuric acid in the usual manner and poured onto 100 parts by volume of a mixture of glacial acetic acid and propionic acid, and 30 parts of water are added. This diazo solution is slowly added dropwise at 0° to 5° C to a solution of 4 parts of the coupling component mixture described above in 20 parts by volume of acid mixture, the product is carefully precipitated at 0° to 10° C by adding 50 parts of water, and the mixture is stirred overnight at 0° to 10° C. The precipitated dyestuff, which contains compounds of the formula

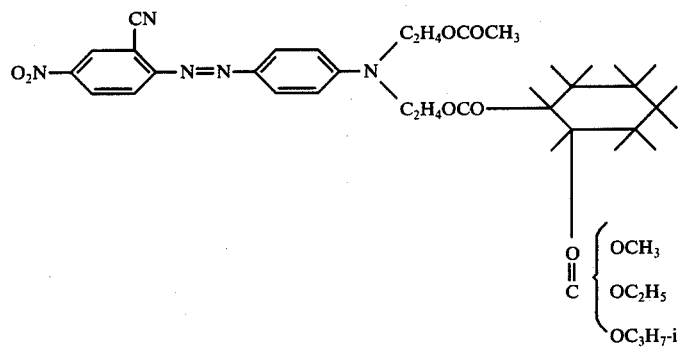

as the main components, is filtered by suction and washed until the washing reacts neutrally. The mixture dyes polyester fibres bluish-tinged red shades having excellent fastness properties.

The following Table 3 illustrates further examples of dyestuffs which can be manufactured in an analogous manner. Only the main components of the particular mixtures produced are indicated.

Table 3

| | D″ | c″ | d″ | $R_1″$ | Y″ | $R_3″$ | Shade on polyester |
|---|---|---|---|---|---|---|---|
| 1 | 2-cyano-4-nitroaniline | H | H | $OCOC_6H_5$ | tetrahydrophthalic acid | $CH_3$ | red |
| 2 | " | Cl | H | $OCOCH_3$ | " | $C_6H_5$ | bluish-tinged red |
| 3 | " | $CH_3$ | H | $OCOC_3H_7$ | " | $C_2H_5$ | violet |
| 4 | 2,4-dinitro-6-bromoaniline | $NHCOCH_3$ | $OCH_3$ | $OCOC_2H_5$ | hexahydrophthalic acid | $CH_3$ | navy blue |
| 5 | 2-chloro-4-nitroaniline | " | H | $OCOCH_3$ | " | $CH_3$ | red |
| 6 | " | " | H | $OCOC_6H_5$ | " | $C_2H_5$ | red |
| 7 | p-nitroaniline | " | H | $OCOC_2H_5$ | " | $CH_3$ | yellowish-tinged red |
| 8 | 4-nitroanthranilic acid methyl ester | H | H | $OCOCH_3$ | endomethylenetetra-hydrophthalic acid | $CH_3,C_2H_5,C_3H_7$ | red |
| 9 | " | Cl | H | $OCOCH_3$ | " | " | red |
| 10 | " | $CH_3$ | H | $OCOCH_3$ | " | $C_2H_5$ | bluish-tinged red |
| 11 | 2,6-dichloro-4-nitroaniline | $CH_3$ | H | $OCOCH_3$ | " | $C_2H_5$ | yellowish-brown |
| 12 | 2-chloro-4-methylsulphonylaniline | $CH_3$ | H | $OCOCH_3$ | hexahydrophthalic acid | $C_2H_5$ | orange |
| 13 | 3-amino-5-nitrobenzisothiazole | $CH_3$ | H | $OCOCH_3$ | " | $CH_3$ | blue |

EXAMPLE 5

7.3 parts of 2-cyano-4-nitro-4'-(N-β-cyanoethyl-N-β-hydroxyethyl)-aminoazobenzene are dissolved in 200 parts of pyridine, the solution is cooled to 10 to 15° C and at this temperature, treated dropwise with 8 parts of hexahydrophthalic acid methyl ester chloride. The mixture is stirred for 1½ hours at 10° to 15° C, poured onto 250 parts of ice, and rendered acid with concentrated hydrochloric acid whilst cooling with ice. The dyestuff which has precipitated is filtered and washed until the washing is neutral. The same dyestuff as described in Table 1, Example 6, is obtained.

EXAMPLE 6

7 parts of 2-cyano-4-nitro-4'-(N,N-bis-β-hydroxyethyl)-aminoazobenzene are dissolved in 200 parts of pyridine, a mixture of 4 parts of hexahydrophthalic acid methyl ester chloride and 2.8 parts of benzoyl chloride is added dropwise at 10 to 15° C, the mixture is stirred for a further 1½ hours at 10 to 15° and subsequently poured onto 250 parts of ice. It is then rendered acid with concentrated hydrochloric acid whilst cooling with ice, and the product is filtered. The residue is washed until neutral and dried. A mixture of dyestuffs is obtained, which as the main component contains the dyestuff of formula

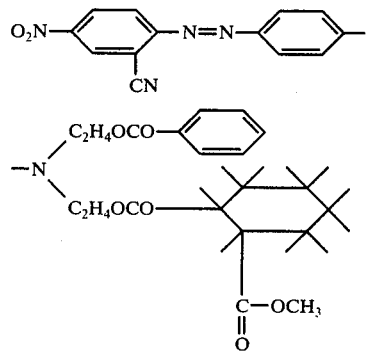

Using this mixture, polyester material can be dyed bluish-tinged red shades having excellent fastness properties.

1. An azo dyestuff compound of the formula

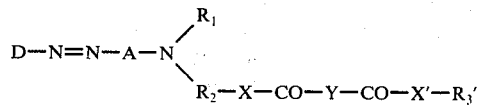

wherein
D is phenyl or phenyl substituted by chloro, nitro, cyano, methylsulfonyl, aminosulfonyl, phenoxy, methoxy, trifluoromethyl, carbomethoxy, bromo, methyl or N-chloro, N,N,N-trimethylaminoacetyl;

A is para-phenylene which is unsubstituted or substituted by $C_1$-$C_2$-alkoxy, $C_1$-$C_2$-alkyl, phenoxy, phenylthio, benzyl, phenyl, cyclohexyloxy, chloro, bromo, $C_1$-$C_{12}$-hydrocarbylcarbonylamino $C_1$-$C_{14}$--hydrocarbyloxycarbonylamino, $C_1$-$C_{15}$-hydrocarbylaminocarbonylamino, formylamino, trifluoromethyl, $C_1$-$C_{12}$-hydrocarbylcarbonyl (methyl) amino, $C_1$-$C_6$-alkylsulfonylamino or halogenated $C_1$-$C_3$-hydrocarbylcarbonylamino;

X and X' independently represent —O—, —S— or —NH—;

$R_1$ is $C_1$-$C_4$-alkyl that is unsubstituted or substituted by cyano, $C_1$-$C_4$-alkoxy, $C_1$-$C_{10}$-hydrocarbylcarbonyloxy, $C_1$-$C_{10}$-hydrocarbyloxycarbonyl, $C_1$-$C_{10}$-hydrocarbylaminocarbonyloxy, phenyl, methoxyphenylcarbonyloxy, hydroxy, or a group of the formula —X—CO—Y—CO—X'—R'$_3$;

$R_2$ is $C_1$-$C_4$-alkylene, or ethyleneoxyethylene;

R'$_3$ is alkyl of 1 to 8 carbon atoms; and the group —CO—Y—CO— represent endomethylenetetrahydrophthalyl, hexahydrophthalyl or tetrahydrophthalyl.

2. An azo compound as claimed in claim 1, of the formula

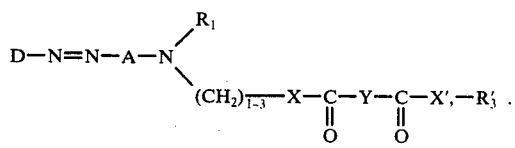

3. An azo compound as claimed in claim 1, of the formula

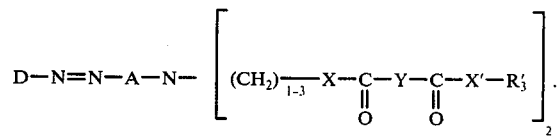

4. An azo compound as claimed in claim 2 of the formula

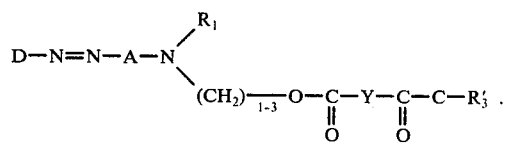

5. An azo compund as claimed in claim 3 of the formula

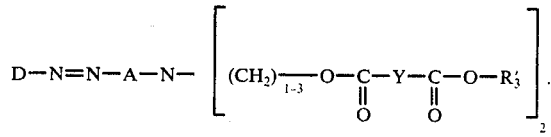

6. An azo dyestuff compound according to claim 1, of the formula

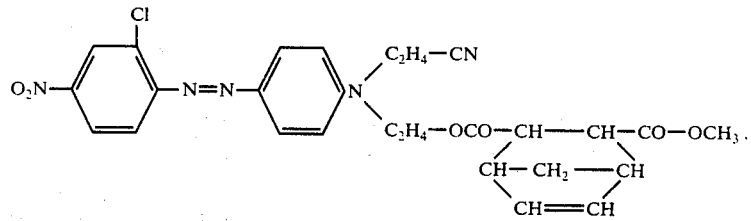

7. an azo dyestuff compound according to claim 1 of the formula
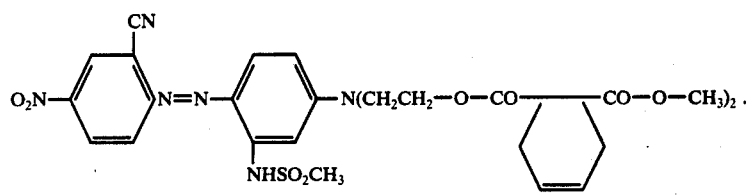
* * * * *